May 10, 1938.    F. CONRAD    2,117,020
COPPER OXIDE RECTIFIER
Filed Sept. 30, 1937    2 Sheets-Sheet 1
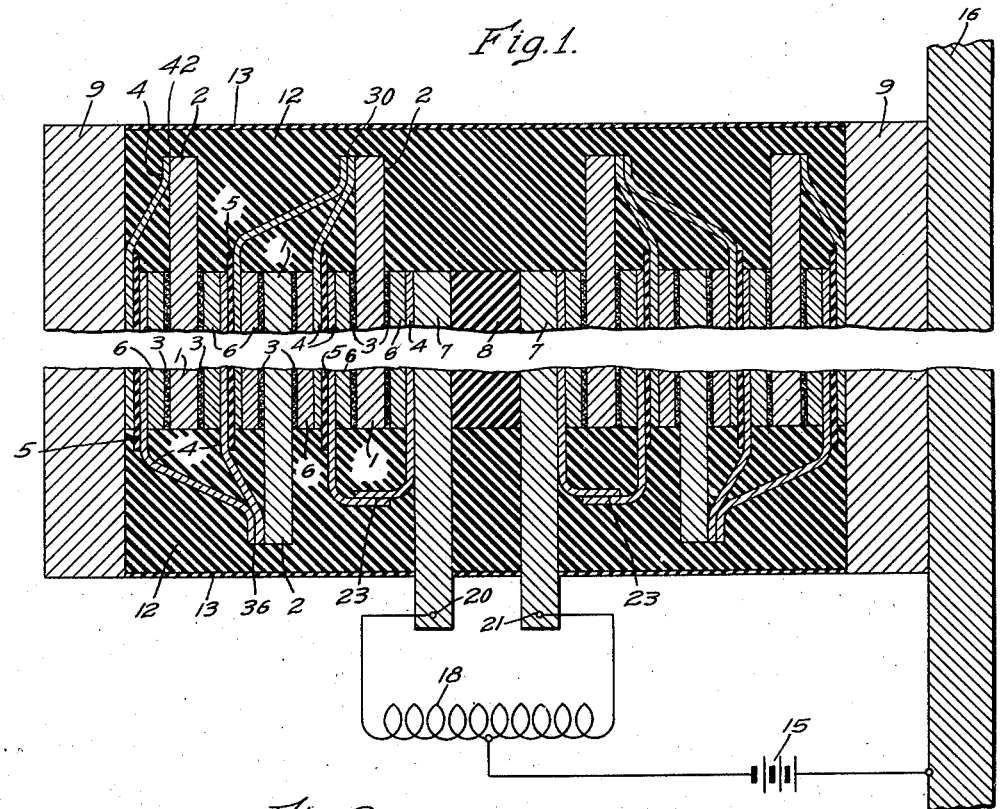
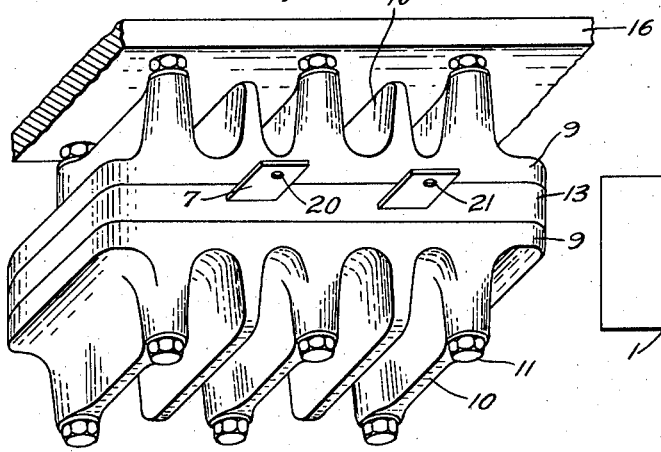
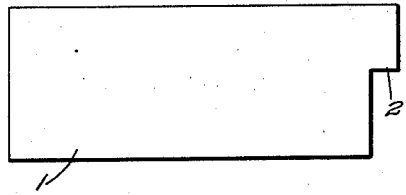
WITNESSES:
INVENTOR
Frank Conrad.
BY
ATTORNEY May 10, 1938.  F. CONRAD  2,117,020
COPPER OXIDE RECTIFIER
Filed Sept. 30, 1937  2 Sheets-Sheet 2
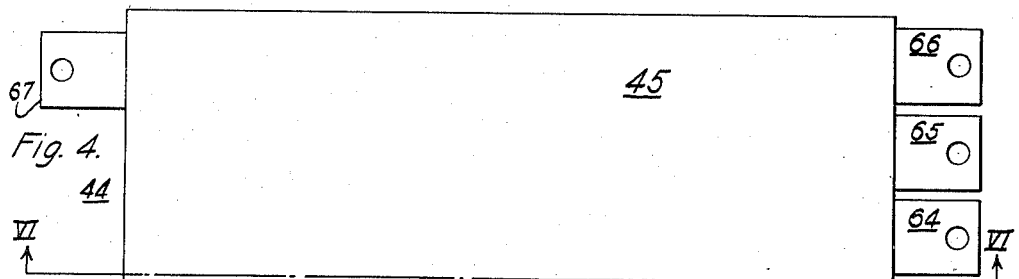
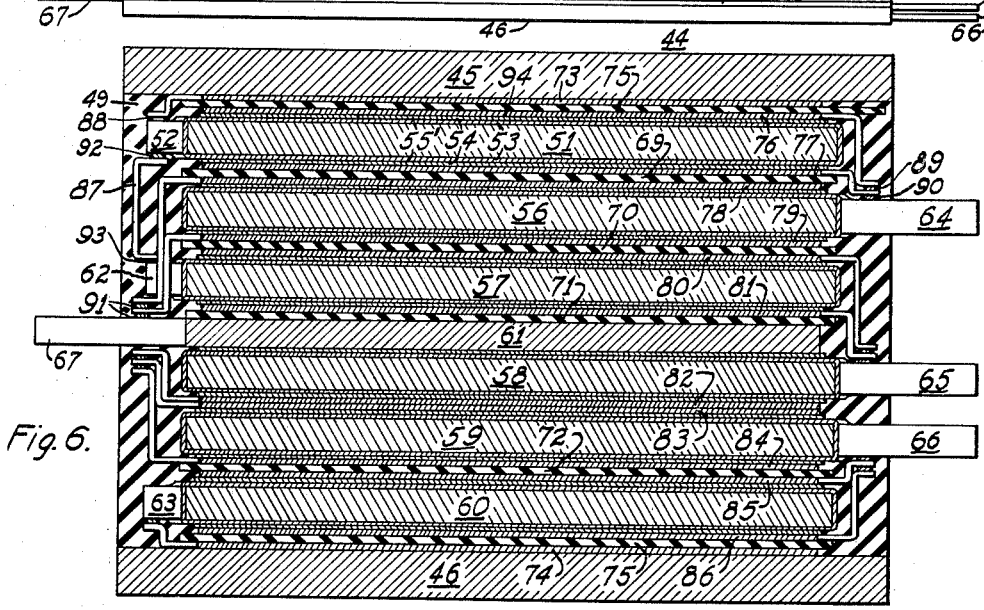
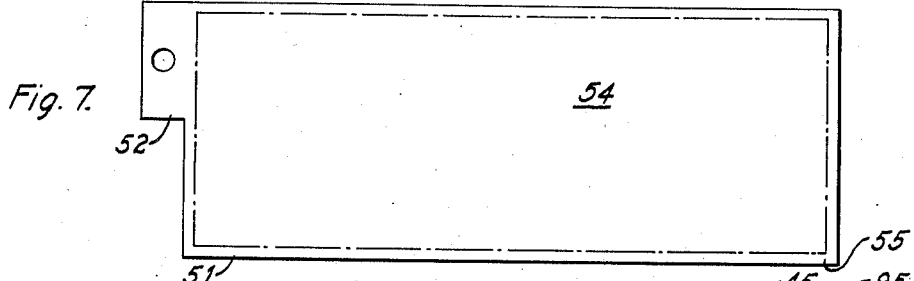
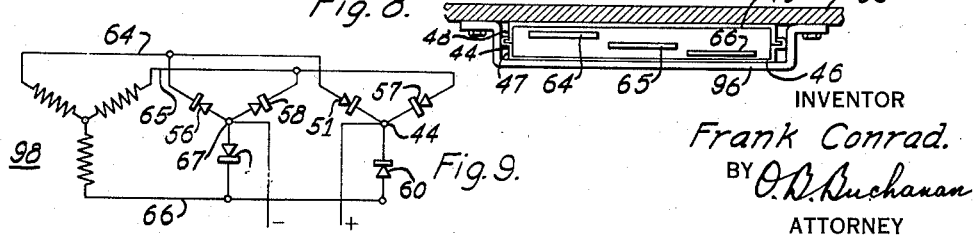
INVENTOR
Frank Conrad.
BY O. D. Buchanan
ATTORNEY Patented May 10, 1938

2,117,020

UNITED STATES PATENT OFFICE 2,117,020

COPPER-OXIDE RECTIFIER

Frank Conrad, Wilkinsburg, Pa., assignor to Westinghouse Electric & Manufacturing Company, East Pittsburgh, Pa., a corporation of Pennsylvania Application September 30, 1937, Serial No. 166,606

13 Claims. (Cl. 175—366)

This application is a substitute for and a continuation-in-part of, my application, Serial No. 86,362, filed June 20, 1936, for copper-oxide rectifiers.

My invention relates to contact rectifiers of the type in which an asymmetrical current-conducting function is obtained at the surface between two dissimilar materials such as the body portion of a copper plate and a red oxide coating formed thereon by oxidation.

My invention has particular relation to a copper-oxide rectifier of unusually low resistance and unusually high current-carrying capacity, which was particularly designed for use in an automobile battery-charging set utilizing a high-frequency alternator of approximately constant-current output-characteristics, to replace the ordinary direct-current generator which has long been standard for automobile battery-charging.

It is an important object of my invention, therefore, to provide a high-current, low-loss copper-oxide rectifier, and particularly one which is small and compact, not only to save in space, but also to save in cost.

A further important object of my invention is to provide such a rectifier which is waterproof, so that it may be placed in an exposed position in an automobile, as underneath the chassis of the same, where it may be readily cooled. It is well known that the life of a copper-oxide rectifier is much greater at moderately low temperatures, as under 50° C. or 75° C., than at higher temperatures. It is very desirable, therefore, in a rectifier for use on an automobile or other self-propelled transportation device, to so build the rectifier that it is quite waterproof, so that it may be subjected directly to the maximum cooling effect of the air in all kinds of weather, with a maximum of reliability and safety. The need for reliability of waterproofing treatment is another circumstance which emphasizes the need for a rectifier of small, compact size.

Heretofore, two types of copper-oxide rectifiers have been known and utilized to some considerable extent. The one type consists of a large number of oxidized copper washers bolted together in a tightly held unit, with interspersed non-rectifying washers, insulating washers, connection-terminals, and large, generously proportioned radiating fins or plates for carrying away the heat. The other type consists of a plurality of self-sustaining, and therefore thick, plates of copper, oxidized on both sides, with their oxide coatings heavily coated with metal, and with a plurality of such units built up in spaced formation, not under pressure, in a manner similar to the structure of the familiar hot-water radiator which is utilized in house-heating, so that the air can blow through the unit, between the plates, individually cooling each copper plate.

Both of these types of rectifiers are obviously not adapted to waterproofing treatment, and they both offer difficulties in the way of obtaining the large area of copper plate which is necessary in order to obtain a high current rating, while keeping down the current-density to a low value such as will reduce the resistance of the unit. Both of these previous designs are also rather wasteful of material, thus tending to have a relatively high cost.

With the foregoing difficulties of the prior art in mind, my invention has for an object the provision of a copper-oxide rectifier consisting of a plurality of thin oxidized-copper plates held together in a compact unit, protected with a waterproofing compound, covering around the edges, or end-closure, and embodied in a compact unit in which the heat-flow is endwise into the end-plates, or through the flat contacting surfaces of the rectifier, rather than radially or edgewise to the edges of the rectifier-plates.

A further object of my invention is to provide a novel stacked polyphase rectifier-unit, and to provide a combination of such a unit with a polyphase source having fairly constant-current characteristics. Heretofore, it has been customary to take care to keep all phases of either a half-wave polyphase contact-rectifier or a full-wave polyphase contact-rectifier at about the same temperature, as only a very slight increase in temperature, in one of the phases, would tend to make it "hog" the load, because of its decreased resistivity in the conducting direction and also because of its increased back-current, the increased forward and back-currents resulting in a still further increase in temperature, tending to mount in a cumulative fashion. In my contact rectifier, I secure such good heat-flow toward the ends of the stack that I can tolerate small differences in temperature because of the fact that the inside of the stack runs at a higher temperature than the end cells thereof, and this is particularly true when I utilize my rectifier-stack in combination with a polyphase source of a type having a fairly constant output-current under full-load conditions.

With the foregoing and other objects in view, my invention consists in the structures, methods and combinations hereinafter described and claimed and illustrated in the accompanying drawings, wherein:

Figure 1 is an enlarged sectional view, which is necessarily somewhat schematic in nature, in order to show some of the paper-thin members, illustrating the construction of my rectifier in one form of embodiment, and illustrating suitable circuit-connections therefor;

Fig. 2 is a bottom perspective view of the same rectifier, shown as being clamped in place against the chassis of an automobile;

Fig. 3 is a plan view of one of the copper or steel plates of the rectifier shown in Fig. 1;

Fig. 4 is a plan view of another form of embodiment;

Fig. 5 is an elevational side view of the rectifier-unit shown in Fig. 4;

Fig. 6 is a sectional view on the line VI—VI of Fig. 4, with the vertical thicknesses greatly enlarged for clarity of illustration;

Fig. 7 is a plan view of an oxidized-copper plate of the unit shown in Fig. 4;

Fig. 8 is an end view of the unit shown in Fig. 4, showing the method of attachment to an automobile chassis; and Fig. 9 is a diagrammatic view of the electrical circuits of a novel combined polyphase generator and rectifier embodying my invention.

The rectifier shown in Figure 1 of the drawings is a single-phase rectifier, and it consists of six copper plates 1 which are preferably of thin stock some 32 mils in thickness, or even 20 mils in thickness, as distinguished from the much thicker plates and disks which have previously been utilized for copper-oxide rectifiers. Each plate is of rectangular form of considerable area, for example, 3" wide by 7" long, in a unit intended to handle a maximum of 30 or 35 amperes continuous rating. Each copper plate 1 is provided with an end-tab 2 which is utilized as a terminal connection. Each of the copper plates 1 is oxidized on both sides to produce a red-oxide coating 3, which is removed at the tab 2.

The single-phase rectifier shown in Fig. 1 also comprises a plurality of connectors 4 made of thin tinned copper plate or thick tinned copper foil; various thin sheets of insulating material 5, such as fish paper, mica, or insulating coatings on the connectors 4 or other sheets; various contact-sheets 6 consisting of lead-foil or lead coatings on the connector-sheets 4; two tin-plated steel (or other conducting-material) terminal-plates 7 which may be of the same thickness as the copper plates and similarly shaped; a piece of centrally disposed fuller board or other insulating sheet 8, for dividing the rectifier into two units or phases making a double-wave, single-phase rectifier; and two massive cast-iron end-plates 9, preferably having transversely extending strengthening and heat-radiating ribs 10, and having a number of perforations along the edges for the receipt of the necessary number of bolts 11 to give the required clamping-pressure on the end-plates. The completed rectifier is sealed in a watertight fashion by filling all of the space between the edges of the end-plates 9, that is, the space around the various elements 1 to 8, with a heavy asphalt cement or gum 12 or other waterproofing compound, which is preferably surrounded by an application of tape 13 in order to prevent the possibility of its oozing out when overheated.

The particular rectifier shown in Fig. 1 is a rectifier designed to be grounded on the chassis or frame 16 of an automobile in which the positive terminal of the battery 15 is grounded to the frame 16, the same as the end-plates 9 of my rectifier. The negative battery-terminal is connected to the midpoint of a single-phase double-winding alternating-current generator 18, such as is described and claimed in my copending application, Serial No. 86,363, filed June 20, 1936. The end terminals of the generator 18 are connected to two rectifier-terminals 20 and 21 which are connected to the steel plates 7, respectively, one plate 7 being disposed on either side of the fuller board 8 at the center of the rectifier-pack.

Disposed directly in contact with each one of the centrally disposed steel terminal-plates 7, I have shown a connector-sheet 4 in Fig. 1. On the other side of this first connector-sheet 4 is next shown a lead-foil 6, and next my first oxidized copper plate 1. Lying in contact with the other side of the first oxidized copper plate 1 is another lead-sheet 6, and then another connector-sheet 4 which is soldered to the first connector-sheet 4, as indicated at 23. This completes my first rectifying cell or element, disposed next to one of the centrally disposed terminal-plates 7.

Next comes a layer of insulation 5 and this is shown as lying next to the last-described connector-sheet 4. Next comes another copper connector-sheet 4, then another lead sheet 6 and another oxidized copper plate 1, and on the other side of it another lead sheet 6 and another copper connector-sheet 4, the two last-mentioned copper connector-sheets being both soldered at 30 to the tab 2 of the first-mentioned copper plate 1, that is the copper plate 1 is disposed nearest to the terminal steel-plate 7 at the center of the pack.

Continuing on outwardly from the center of the pack, I have next shown another piece of paper or other insulating sheet 5, another copper connector-sheet 4, a lead sheet 6, and a third oxide-coated copper plate 1, backed by another lead sheet 6 and another copper connector-sheet 4, the two last-mentioned copper connector-sheets 4 being soldered at 36 to the tab 2 of the second copper plate 1, counting outwardly from the center of the pack.

Beyond the third copper plate 1, I have shown another sheet of paper or mica 5 and a final sheet of copper connector 4 which lies flat against one of the end-plates 9 and which extends over and is soldered at 42 to the tab 2 of the third copper plate 1.

From the foregoing description of the rectifier unit shown in Fig. 1, it will be seen that the six copper plates 1 are divided into two groups or phases, each consisting of three plates or cells connected in series, the two copper-oxide coatings of the first plate being connected to the terminal 20 or 21 as the case may be, the two oxide coatings of the second plate being connected to the mother-copper of the first plate, the two oxide coatings of the third plate being connected to the mother-copper of the second plate, and the mother-copper of the third plate being connected to one of the grounded end-plates 9.

It will be observed that the coating of gum 12 and tape 13 around the whole provides a simple and reliable watertight covering which enables my rectifier to operate without harm even when it is immersed in water. Although the waterproofing material is a poor conductor of heat, it covers only a small area, leaving all of the end-plates 9 exposed to carry off the heat.

It will be noted that I have utilized only very thin sheets of material in the pack which constitutes my rectifier, so that the entire pack may be only a little over a half-inch in thickness, or even less than a half-inch in thickness, which is materially less than its length or width, thus not only reducing its size and cost and the difficulty of waterproofing the same, but reducing the maximum distance which the heat has to flow from the flat sides or surfaces of the oxidized copper plates 1, in order to reach the terminal plates 9.

My row of clamping-bolts 11 along the edges of the unit are sufficient in number to apply a strong clamping pressure to the entire pack, thereby making firm contacts and facilitating the heat-transfer longitudinally across the various layers which make up the pack. Since the clamping-bolts are along the edges, I avoid the necessity for the use of insulated bolts, as in the familiar bolted-disk construction of copper-oxide rectifiers. My edge-location of the bolts requires the use of heavy ribs 10 in order to give as uniform a pressure as, or even a more uniformly distributed pressure than, would be obtained by centrally located insulated bolts, but it saves some loss of material and some considerable expense which would be entailed by punching holes through the various sheets which make up the pack.

My use of rectangular plates of large area, as distinguished from a washer construction, reduces the scrap to practically nothing, as well as greatly reducing the number of rectifier plates which have to be individually processed, and it also avoids the necessity for connecting certain plates in parallel, as is necessary in the stacked-disk construction.

My use of a clamped-plate construction with the oxidized copper plates packed close together with insulating sheets to separate them, as distinguished from a radiator-like, self-sustaining plate construction of rectifier, results in a rectifier in which much thinner stock may be chosen for the oxidized copper sheets, thereby resulting in a considerable saving in material and in a very considerable reduction in the overall size of the complete rectifier outfit or unit. Furthermore, the tight clamping pressure very considerably reduces the resistance of heat-flow at the various contact surfaces between successive sheets of the stack.

My use of the massive iron end-plates 9 produces a rectifier which has a certain amount of heat-storing capacity, enabling it to carry heavy loads for a considerable time, even several hours in extent, without reaching its stable temperature, the generated heat being meanwhile stored up in the end plates, thereby enabling the rectifier to carry heavy loads for short periods of time, which in general is all that is required of an automobile battery-charging outfit because automobiles are frequently run for only short periods at a time, and even on long runs, most automobiles are provided with suitable overcharge-preventing means which I have not deemed it necessary to show, for the purpose of greatly reducing the charging-rate when the battery is fully charged, thus limiting the time during which the maximum output is required of the rectifier, even when the automobile is operated for long periods of time, as on trips.

The heat-storage capacity of my end-plates 9 is preferably augmented also by bolting one of the plates tightly against the automobile frame or chassis 16, which may be done either with the same bolts 11 or other bolts as will be obvious.

My method of preparing the oxidized copper plates 1 is one which has been known in the art, but as there are several methods of doing this, and in order to give a concrete example of a successful method of preparation, I shall outline the steps which I prefer to utilize, with the understanding that I am not limited to this precise method of formation of the oxidized copper plates. The plates, which are of Chile copper, are first cleaned by being given what is called a "bright" dip in hot alkali followed by acid, which is a standard cleaning process, the plates being suspended on a notched hanger or fork during the process. While still suspended, the plates are next placed in an oxidizing furnace at approximately 1000° C. for a suitable time, which may be eleven minutes, and are next put in an annealing furnace at a suitable temperature which may be about 500° or 550° C. In order to obtain the right resistance-characteristics it is necessary to quench the plates in cold water from a suitable annealing temperature, which is preferably about 500° or 550° C. as previously indicated. Immediately after leaving the annealing furnaces, the plates are quenched in ordinary water. Next the outer covering of black oxide is removed by immersion of the plates in a sodium-cyanide solution for approximately 30 seconds, after which the plates are washed, first in cold water, then in hot water, and subsequently dried. The plates are then painted or sprayed with a colloidal graphite solution for coating the red-oxide coating with a graphite coating which assists in making a good contact with the oxide. The plates are finally dried in a warm oven for a few hours at not over 100° C. At some point in the manufacture, preferably after the cyanide dip, the oxide coating is ground off from both sides of the tab 2, so that terminal connections may be at the tab 2 to the mother-copper of the plate.

In Figs. 1 to 3, I have illustrated my invention in a double-wave or full-wave rectifier of a single-phase type. It is an important feature of my invention to embody the rectifier in a polyphase type and I have illustrated one embodiment of a polyphase construction in Figs. 4 to 9. In effecting a polyphase embodiment of my invention, I may advantageously utilize the same cell-construction, lead contact-sheets and heavily clamped end-plates as in Figs. 1 to 3. However, in order to illustrate a lighter stacked-cell construction which may be utilized with either the single-phase or the polyphase embodiments of my rectifier-unit, I have illustrated my polyphase form of embodiment, in Figs. 4 to 8, in a construction which does not have, and does not require, such massive end-plates or such heavy clamping-pressure as the construction shown in Figs. 1 to 3. I wish it to be distinctly understood, however, that either the single-phase or the polyphase rectifier may be embodied in either the heavily-clamped construction or the light-weight construction.

My light-weight construction shown in Figs. 4 to 8 utilizes a type of rectifying cell which does not require a heavy clamping-pressure, as will be subsequently described, and the whole stack is enclosed in a small flat "tin" box 44, as shown in Fig. 8. The tin box is formed by making the two end plates 45 and 46 of thin tinned sheet-iron bent in channel formation so as to provide sides 47, which are soldered and beaded as shown at 48. Thus I provide an open-ended sheet-metal container surrounding the stack of cells and comprising integrally united flat end-plates 45 and 46 and side-plates 47. This makes the waterproofing process much simpler as the waterproofing gun 49 has to be applied only in the two open ends of the box 44.

In a construction in which the necessity for a heavy clamping-pressure is to be avoided, it is necessary to use some form of rectifier cell other than that which is utilized in Figs. 1 to 3, and to this end I have illustrated, in my polyphase embodiment of my invention, a copper-oxide cell-construction which avoids the necessity for the lead contact-sheets 6 which require a heavy pressure in order to make them effective.

As shown in Fig. 7, each copper-plate or rectifier-cell 51 is provided, as before, with an end-tab 52. The oxide coating 53 (Fig. 6) is formed on the plate in the manner previously described, and as illustrated, very much enlarged, in Fig. 6, and the oxide is also ground off of the surface of the end-tab 52, as also illustrated in Fig. 6.

In the form of embodiment shown in Figs. 6 and 7, a sprayed or so-called sputtered metallic coating 54 is applied to all but a narrow marginal rim 55 (Fig. 7) of each oxide coating 53, that is, on each side of the oxidized copper plate 51, the extent of the sprayed-metal portion being indicated in chain lines in Fig. 7. In order to cause the sprayed metal to adhere better to the oxide coating, the portion of the oxide surface which is to be sprayed, that is, all except the rim 55, is first provided with a coating of graphite 55' (Fig. 6). The sprayed-metal coating 54 makes a good electrical contact with the copper oxide 53, and with the next adjacent contact plate of the stack without the necessity for a heavy clamping-pressure.

As shown in Fig. 6, my rectifier stack utilizes six prepared oxidized copper plates 51, 56, 57, 58, 59 and 60 and one intermediate iron terminal plate 61. All of these plates are provided with end-tabs, some of the tabs extending on the right-hand side and some on the left, some at the front as viewed in Fig. 6, and some at the center or back, so as to provide the necessary clearances. The plates 51, 57 and 60 are exactly alike and their respective tabs 52, 62 and 63 are all on the left-hand side, all three tabs 52, 62 and 63 being in the rear as viewed in Fig. 6. The oxidized copper plates 56, 58 and 59 are provided with longer tabs 64, 65 and 66, which are all disposed at the right-hand side as viewed in Fig. 6, the tab 64 being at the front, the tab 65 in the center, and the tab 66 at the back. These three tabs extend out far enough to extend beyond the end of the box 44. These constitute the three polyphase terminals of the rectifier-unit.

The iron terminal-plate 61 is provided with a long tab 67 which extends out of the left-hand end of the box as viewed in Fig. 6, to constitute the negative direct-current terminal of the rectifier-unit. This tab is disposed at the front as viewed in Fig. 6.

The insulated parts of the stacked cell, as shown in Fig. 6, are separated by various sheets of paper 69, 70, 71 and 72, and the whole stack, except the box 44 and two terminal copper-foil connecting-sheets 73 and 74, is enclosed in an insulating paper cell 75. The electrical connections between different layers of the stack are effected by copper-foil connecting-sheets 73, 76, 77, 78, 79, 80, 81, 82, 83, 84, 85, 86 and 74, and by a small copper-foil jumper 87. The foil 73 lies against the top-plate 45 and has a tab which is soldered at 88 to the tab 52 of the first copper plate 51.

The foil 76 lies against the top sprayed-metal coating 54 of the first copper plate 51 and has a tab which is soldered at 89 to the alternating-current terminal-tab 64 of the second copper plate 56. The foil 77 lies against the bottom sprayed-metal coating 54 of the first copper plate 51 and has a tab which is soldered at 90 to the alternating-current terminal-tab 64 of the second copper plate 56.

The foils 78 and 79 contact with the top and bottom sprayed-metal coatings of the second copper sheet 56 and have tabs which are soldered at 91 to the negative terminal-tab 67. In like manner, the oxide coatings of the third copper plate 57 are connected, by the foils 80 and 81, to the second alternating-current terminal 65.

The top sprayed-metal coating of the fourth copper plate 58 makes direct contact with the bottom of the iron terminal-plate 61, and needs no copper-foil connector. The bottom oxide coating of said fourth copper plate 58, and both the top and bottom oxide coatings of the fifth copper plate 59, are connected to the negative direct-current terminal 67 by the foils 82, 83 and 84. The top and bottom oxide coatings of the sixth, or last, copper plate 60 are connected to the third alternating-current terminal-tab 66 by the foils 85 and 86.

The bottom foil 74 lies against the top of the bottom end-plate 46 and makes contact with the short tab 63 of the sixth copper plate 60.

The short tabs 52 and 62 of the first and third copper plates 51 and 57 are connected by the copper-foil jumper 87 which is soldered thereto at 92 and 93, respectively.

It will be seen from Fig. 6 and from the equivalent electrical-circuit diagram of Fig. 9, that my polyphase rectifier-unit comprises, in effect, two star-connected rectifier-circuits, one conducting positive half-waves of current from the polyphase terminals 64, 65 and 66, and the other conducting negative half-waves of current from said polyphase terminals. The positive half-waves flow from the polyphase terminals 64, 65 and 66 through the cells 51, 57 and 60, respectively, to the box 44, which constitutes the positive direct-current terminal, this arrangement being utilized because the particular rectifier which is illustrated was designed to be applied in an automobile battery-charging system in which the positive battery-terminal is grounded. The negative half-wave currents are conducted from the polyphase terminals 64, 65 and 66 through the cells 56, 58 and 59, respectively, to the negative direct-current terminal 67.

After the stack has been assembled, as above described, and as shown in Fig. 6, the whole is firmly held under light pressure, while the box-sides 47 (see Fig. 8) are beaded and soldered as shown at 48, after which the two ends of the box are sealed with a filling of waterproofing insulating gum 49 (Fig. 6).

In the process of assembly, however, it is very desirable, from a thermal standpoint, to provide some means for facilitating the flow of heat from the various copper plates, such as the top plate 51 (Fig. 6), through each of the sprayed-metal layers 54 to the next adjacent contacting-part of the stack, such as the upper foil-connector 76 which is associated with said top copper plate 51. The sprayed-metal coating 54 is rough, somewhat after the order of sandpaper, although the points are not as sharp, and the points make very good electrical connection with the foil 76 without any difficulty, but the spaces between the contacting points, if filled with air, constitute insulating pockets which seriously curtail the flow of heat toward the end-plates 45 and 46 of the box 44. For this reason, I prefer to utilize a filling 94 (Fig. 6), of better heat-conducting properties than air, interspersed between each of the highly conducting sprayed-metal coatings 54 and the next adjacent element (such as 76) of the stack. This heat-conducting filling or layer 94 may, or may not, be electrically conducting since the contacting points of the sprayed-metal layer make sufficiently good electrical contacts. Said heat-conducting filling layer 94 may conveniently be a low-melting-point gum which is chosen for its high heat-conducting properties, or other heat-conducting means may be utilized for filling, or substantially filling, the voids between the rough granules or points of the sprayed-metal coatings 54.

As shown in Fig. 8, my completed rectifier-unit is adapted to be clamped to the bottom of a frame-member 95 of an automobile-chassis, against which it is held flatly by any convenient clamping-bracket 96. The automobile-frame 95 and the clamping bracket 96 serve as heat-conducting media for dissipating the heat generated in the rectifier.

In general, although the lightly-clamped construction of Figs. 4 to 8 is somewhat smaller in size and weight, a better performance is obtained with a tightly clamped construction such as is shown in Figs. 1 to 3. With this tight clamping, the temperature of the innermost copper cell may run from 5° to 8° C. warmer than the temperature of the outermost copper cells which are closest to the end-plates. If the ambient temperature of the air is not too high, it is permissible to permit a temperature-rise of about 15° C. over the ambient temperature of the air.

In previous applications of contact-rectifiers, a slight temperature-difference of even 5° to 8° C. in the temperature of the various phases of the rectifier would be quite prohibitive, necessitating a reduction in the rating of the rectifier because of the tendency of the hot cell to "hog" the load and burn itself out, resulting in a short-circuit. As previously noted, however, my invention is particularly designed and intended for use in an automobile battery-charging set utilizing a high-frequency alternator or generator having approximately constant-current output-characteristics. The polyphase embodiment of my rectifier, for example, is adapted to receive energy from an approximately constant-current three-phase generator 98 (Fig. 9) such as is described and claimed in my application, Serial No. 166,605, filed September 30, 1937, for automotive generating systems. The constant-current quality of the generator sufficiently offsets the tendency of the hot phase of the rectifier to take too much current and burn out, thus making it possible to effect the saving in the space and materials which is brought about by mounting all three phases of the rectifier in a single compact stack.

When I define my stack as being compact, in the foregoing description and in the appended claims, I contemplate a construction which is substantially free of laterally projecting heat-radiating fins, except for the necessary intermediate terminal connection-means, the stack being short and flat so that the heat-transfer is mainly through the two end-plates of the stack.

While I have illustrated my invention in two preferred forms of embodiment, and while I have indicated a preferred process of forming the oxidized copper plates, I wish it to be understood that my invention is not limited to these details and that my description and illustration thereof should not be taken in a limiting sense. I desire, therefore, that the appended claims shall be accorded the broadest construction consistent with their language and the prior art.

I claim as my invention:

1. A plate-type rectifier of the type in which asymmetric conductivity is obtained between the contacting flat surfaces of two dissimilar sheet-like materials, characterized by a plurality of cells of such pairs of dissimilar sheet-like materials having asymmetrically conducting flat contact-surfaces, said plurality of cells being stacked flatwise in a compact stack, with insulating sheets between at least some of said cells, the length and breadth of each contact-surface being large with respect to the overall thickness of the stack of cells, a heavy, substantially rigid end-plate of good thermal and electrical conductivity at each end of the stack, terminal-connection means extending laterally from a point in said cells insulated from, and between, the said end-plates, means for exerting a strong clamping-pressure between the two end-plates at points removed from said terminal-connection means, and a substantially watertight sealing-medium of relatively poorer heat-conducting qualities for protecting the parts between said end-plates against the entrance of moisture.

2. The invention as specified in claim 1, characterized by said cells being copper-oxide rectifiers in which the asymmetrically conducting surface is between a copper-oxide coating and the mother-copper on which the coating is formed.

3. A stacked contact-rectifier construction, comprising a plurality of cells stacked flatwise in a compact stack, each of said cells comprising a metal sheet having formed, on each side thereof, a coating of a chemical compound of said metal of a type in which asymmetric conductivity is obtained at the contact-surface between the compound and the mother-metal, a soft-metal contact-plate interspersed between each of said coated sheets and the next adjacent element of the stack for assuring a good thermal and electrical connection, insulating sheets between successive electrically insulated parts of said rectifier, the length and breadth of each cell being large with respect to the overall thickness of the stack of cells, a heavy, substantially rigid end-plate of good thermal and electrical conductivity at each end of the stack, terminal-connection means extending laterally from a point in said cells insulated from, and between, the said end-plates, means for exerting a strong clamping-pressure between the two end-plates at points removed from said terminal-connection means, and a substantially watertight sealing-medium of relatively poorer heat-conducting qualities for protecting the parts between said end-plates against the entrance of moisture.

4. The invention as specified in claim 1, characterized by at least one of said cells being a copper-oxide rectifier consisting of a copper plate having a red-oxide coating formed on each side thereof, and a connection-sheet disposed in conducting relation to each of the oxide coatings of said copper plate, the two connection-sheets being connected together and to the mother-copper of an adjacent cell.

5. A rectifier comprising a plurality of flat, asymmetrically conducting cells of contacting sheet-like materials, said plurality of cells being stacked flatwise in a compact stack, the length and breadth of each cell being large with respect to the thickness of the stack of cells, a flat end-plate of good heat-conducting material disposed at each end of the stack, terminal-connection means extending laterally from a point in said cells insulated from, and between, the said end-plates, means for electrically connecting and holding together the said end-plates at points removed from said terminal-connection means, and a substantially watertight sealing-medium of relatively poorer heat-conducting qualities for protecting the parts between said end-plates against the entrance of moisture.

6. A stacked copper-oxide rectifier construction, comprising a plurality of cells and at least two terminal plates for said plurality of cells, each of said cells comprising a copper plate having a red-oxide coating formed on each side thereof, and a connection-sheet disposed in conducting relation to each of the oxide coatings of said copper plate, insulating sheets between successive electrically insulated parts of said rectifier, and series-connection means comprising flexible conducting sheets each having a portion disposed flatwise in engagement with one surface of said rectifier and another portion bent into another plane for engagement with an axially displaced member of said stack.

7. A stacked contact-rectifier construction comprising a plurality of cells and at least two terminal plates for said plurality of cells, each of said cells comprising a metal sheet having formed, on each side thereof, a coating of a chemical compound of said metal of a type in which asymmetric conductivity is obtained at the contact-surface between the compound and the mother-metal, and a connection-sheet disposed in conducting relation to each of the coatings of said coated sheet, insulating sheets between successive electrically insulated parts of said rectifier, and series-connection means comprising flexible conducting sheets each having a portion disposed flatwise in engagement with one surface of said rectifier and another portion bent into another plane for engagement with an axially displaced member of said stack.

8. A rectifier comprising a plurality of flat, asymmetrically conducting cells of contacting sheet-like materials, said plurality of cells being stacked flatwise in a compact stack, the length and breadth of each cell being large with respect to the thickness of the stack of cells, an open-ended sheet-metal container surrounding said stack of cells and comprising integrally united flat end-plates and side plates, terminal-connection means extending laterally from said stack of cells through an open end of said container, and a substantially watertight closure-medium of relatively poorer heat-conducting qualities for guarding against the entrance of moisture into the ends of said open-ended container.

9. The invention as specified in claim 5, characterized by said cells beng copper-oxide rectifiers in which the asymmetrically conducting surface is between a copper-oxide coating and the mother-copper on which the coating is formed, and a highly conducting metallic coating adhering to said copper-oxide coating for affording a light-pressure contact-surface of good electrical conductive properties.

10. The invention as specified in claim 8, characterized by said cells being copper-oxide rectifiers in which the asymmetrically conducting surface is between a copper-oxide coating and the mother-copper on which the coating is formed, and a highly conducting metallic coating adhering to said copper-oxide coating for affording a light-pressure contact-surface of good electrical conductive properties.

11. A stacked contact-rectifier construction, comprising a plurality of cells stacked flatwise in a compact stack, each of said cells comprising a metal sheet having formed, on each side thereof, a coating of a chemical compound of said metal of a type in which asymmetric conductivity is obtained at the contact-surface between the compound and the mother-metal, said coating having a highly conducting metallic coating adhering thereto for providing a contact-surface of good electrical conductive properties, a filling of better heat-conducting properties than air interspersed between each of said highly conducting metallic coatings and the next adjacent element of the stack, insulating sheets between successive electrically insulated parts of said rectifier, the length and breadth of each cell being large with respect to the overall thickness of the stack of cells, a flat end-plate of good heat-conducting material disposed at each end of the stack, terminal-connection means extending laterally from a point in said cells insulated from, and between, the said end-plates, means for electrically connecting and holding together the said end-plates at points removed from said terminal-connection means, and a substantially watertight sealing-medium of relatively poorer heat-conducting qualities for protecting the parts between said end-plates against the entrance of moisture.

12. A stacked polyphase contact-rectifier unit comprising a plurality of flat, asymmetrically conducting cells of contacting sheet-like materials, said plurality of cells being stacked flatwise in a compact stack, the length and breadth of each cell being large with respect to the thickness of the stack of cells, a flat end-plate of good heat-conducting material disposed at each end of the stack, whereby the end cells of the stack run cooler than the centrally disposed cells of the stack, at least one direct-current terminal-connection means extending laterally from an intermediate point in said stack of cells, and a plurality of polyphase terminal-connection means, characterized by some of said phases of rectifier-cells differing in their distance from the heat-radiating end-plates.

13. In combination, a polyphase source of a type having a fairly constant output-current under full-load conditions, and a stacked polyphase contact-rectifier unit connected thereto, said rectifier unit comprising a plurality of flat, asymmetrically conducting cells of contacting sheet-like materials, said plurality of cells being stacked flatwise in a compact stack, the length and breadth of each cell being large with respect to the thickness of the stack of cells, a flat end-plate of good heat-conducting material disposed at each end of the stack, whereby the end cells of the stack run cooler than the centrally disposed cells of the stack, at least one direct-current terminal connection means extending laterally from an intermediate point in said stack of cells, and a plurality of polyphase terminal-connection means for said stack of cells, characterized by some of said phases of rectifier-cells differing in their distance from the heat-radiating end-plates.

FRANK CONRAD.